US012791186B2

(12) United States Patent
Irvin

(10) Patent No.: US 12,791,186 B2
(45) Date of Patent: Nov. 10, 2026

(54) ADJUSTABLE LENGTH CROSSOVER TUBES AND METHODS OF MAKING AND USING THE SAME

(71) Applicant: Andrew Irvin, Locust Grove, GA (US)

(72) Inventor: Andrew Irvin, Locust Grove, GA (US)

( * ) Notice: Subject to any disclaimer, the term of this patent is extended or adjusted under 35 U.S.C. 154(b) by 280 days.

(21) Appl. No.: 18/905,660

(22) Filed: Oct. 3, 2024

(65) Prior Publication Data

US 2026/0098637 A1 Apr. 9, 2026

(51) Int. Cl.
*F23K 5/00* (2006.01)
*A47J 37/07* (2006.01)

(52) U.S. Cl.
CPC ............... *F23K 5/005* (2013.01); *A47J 37/07* (2013.01); *F23K 5/007* (2013.01)

(58) Field of Classification Search
CPC ........... A47J 37/07; F23K 5/005; F23K 5/007
See application file for complete search history.

(56) References Cited

U.S. PATENT DOCUMENTS

| | | | | |
|---|---|---|---|---|
| 4,561,419 A * | 12/1985 | Koziol | A47J 37/0713 | 126/41 R |
| 4,773,384 A * | 9/1988 | Koziol | F23D 14/46 | 126/41 R |
| 5,361,577 A * | 11/1994 | Cromer | F23R 3/48 | 285/227 |
| 6,102,029 A * | 8/2000 | Stephen | A47J 37/0713 | 126/41 R |
| 9,353,952 B2 * | 5/2016 | Overby | F23R 3/48 | |
| 9,675,208 B2 * | 6/2017 | Parrish | F23D 14/46 | |
| 10,156,363 B2 * | 12/2018 | Barton | F23R 3/48 | |
| 2009/0250048 A1 * | 10/2009 | Educate | F23D 14/46 | 431/258 |
| 2014/0137536 A1 * | 5/2014 | Cloninger | F23R 3/48 | 60/39.37 |

* cited by examiner

*Primary Examiner* — Jesse S Bogue

(57) ABSTRACT

Adjustable length crossover tubes for gas grills are disclosed. Methods of making and using adjustable length crossover tubes for gas grills are also disclosed.

20 Claims, 10 Drawing Sheets

ADJUSTABLE LENGTH CROSSOVER TUBES AND METHODS OF MAKING AND USING THE SAME

FIELD OF THE INVENTION

The present invention relates to adjustable length crossover tubes for gas grills and methods of making and using the same.

BACKGROUND OF THE INVENTION

There is a need in the art for improved crossover tubes for gas grills.

SUMMARY OF THE INVENTION

The present invention is directed to adjustable length crossover tubes for gas grills. In some embodiments, the crossover tube comprises: two or more telescoping tubes; and a spring positioned within the two or more telescoping tubes, wherein the spring provides a spring return force in response to a telescoping force applied onto one or both ends of the crossover tube. In other embodiments, the crossover tube comprises: two or more telescoping tubes; and a spring positioned over the two or more telescoping tubes, wherein the spring provides a spring return force in response to a telescoping force applied onto one or both ends of the crossover tube. The crossover tubes of the present invention may comprise other features to provide ease of use, and effectiveness of the described crossover tubes.

In some embodiments, the crossover tube comprises: (A) two or more telescoping (i.e., overlapping) tubes, the two or more telescoping tubes being connected to one another so as to provide an aligned tube gas outlet that extends from a first crossover tube end to a second crossover tube end opposite the first crossover tube end; and (B) a force-applying mechanism that forces the first crossover tube end away from the second crossover tube end, the crossover tube being attachable to a gas burning system (e.g., a gas grill) so as to provide crossover tube gas flow between two gas burning sections (e.g., parallel gas burners of a gas grill) of the gas burning system. The force-applying mechanism allows the crossover tube to move from a non-use (or maximum) crossover tube length $L_O$ to an in-use (or a telescoping force $F_T$ induced) crossover tube length $L_O$ that is less than the non-use crossover tube length $L_O$ when a telescoping force $F_T$ is applied to the first crossover tube end and/or the second crossover tube end, while continuously applying a "return force" forcing the first crossover tube end away from the second crossover tube end.

In desired embodiments, the force-applying mechanism comprises a spring mounted within and/or external of the two or more telescoping tubes, typically within the two or more telescoping tubes; however, it should be understood that any other similar force-applying mechanism could be used in and/or on the crossover tubes of the present invention (e.g., an adhesive, one or more rubber bands, combinations thereof, etc.).

In some embodiments, the crossover tube comprises: (A) two or more telescoping tubes, the two or more telescoping tubes being connected to one another so as to provide an aligned tube gas outlet that extends from a first crossover tube end to a second crossover tube end opposite the first crossover tube end; and (B) a spring positioned within (or over) the two or more telescoping tubes, the spring enabling the crossover tube to move from a non-use (or maximum)

crossover tube length $L_O$ to an in-use (or a telescoping force induced) crossover tube length $L_O$ that is less than the non-use crossover tube length $L_O$ while applying a spring force that forces the first crossover tube end away from the second crossover tube end the crossover tube being attachable to a gas burning system (e.g., a gas grill) so as to provide crossover tube gas flow between two gas burning sections (e.g., parallel gas burners of a gas grill) of the gas burning system.

The present invention is further directed to methods for making adjustable length crossover tubes for gas grills. In some embodiments, the method for making a crossover tube comprises: positioning a spring within (or over) two or more telescoping tubes so that the spring provides a spring return force in response to a telescoping force applied onto one or both ends of the crossover tube.

The present invention is even further directed to methods of using adjustable length crossover tubes for gas grills. In some embodiments, the method for using a crossover tube comprises: attaching a crossover tube to a gas burning system (e.g., a gas grill) so as to connect a first gas outlet section of the gas burning system (e.g., a gas grill) to a second gas outlet section of the gas burning system (e.g., a gas grill), the crossover tube comprising: two or more telescoping tubes; and a spring positioned within (or over) the two or more telescoping tubes, wherein the spring provides a spring return force in response to a telescoping force applied onto one or both ends of the crossover tube.

In some embodiments, the method for using a crossover tube comprises: applying a telescoping force onto one or both ends of a crossover tube so as to cause telescoping of two or more telescoping tubes of the crossover tube, and an increase in a spring return force of a spring positioned within (or over) the two or more telescoping tubes of the crossover tube in response to the telescoping force; and attaching the crossover tube to a gas burning system (e.g., a gas grill) so as to connect a first gas outlet section of the gas burning system (e.g., a gas grill) to a second gas outlet section of the gas burning system (e.g., a gas grill).

The present invention is even further directed to kits for making and/or modifying a gas grill. In some embodiments, the kits of the present invention comprise: one or more crossover tubes as described herein. In some embodiments, the kits of the present invention comprise from two to five crossover tubes as described herein.

The present invention is even further directed to gas grills. In some embodiments, the gas grills of the present invention comprise: one or more crossover tubes, wherein at least one of the one or more crossover tubes comprises a crossover tube as described herein.

These and other features and advantages of the present invention will become apparent after a review of the following detailed description of the disclosed embodiments and the appended claims.

BRIEF DESCRIPTION OF THE FIGURES

The present invention is further described with reference to the appended figure, wherein.

Figure 1:
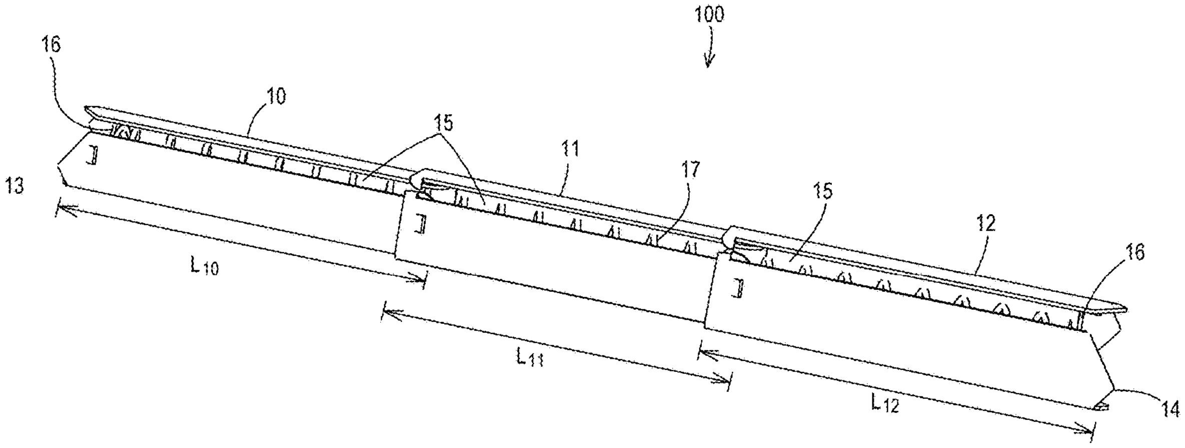
FIG. 1 depicts an exemplary crossover tube of the present invention.

The features of the present crossover tubes, gas burning systems (e.g., gas grills), kits, and methods are set forth in part in the following preferred embodiments. This overview is intended to provide nonlimiting descriptions of the present subject matter and is not intended to provide an exclusive or exhaustive explanation. For example, although most of the herein-described crossover tube embodiments describe a crossover tube having a spring component positioned within two or more telescoping tubes, similar crossover tubes of the present invention might have a spring component positioned over at least an outer portion of the two or more telescoping tubes. The preferred embodiments below provide further information about the crossover tubes, gas burning systems (e.g., gas grills), kits, and methods of the present invention as described herein.

DETAILED DESCRIPTION OF THE INVENTION

The present invention is directed to crossover tubes. It should be noted that the term "carryover tubes" could also be used instead of "crossover tubes" to describe the tubes of the present invention. The present invention is further directed to methods of making crossover tubes (or carryover tubes). The present invention is even further directed to methods of using crossover tubes (or carryover tubes).

FIGS. 1-11 depict exemplary crossover tubes 100, and exemplary gas grill systems using the exemplary crossover tubes 100. As shown in FIGS. 1-11, in some embodiments, the disclosed crossover tubes 100 comprise: three telescoping tubes 10/11/12; and a spring 17 positioned within the three telescoping tubes 10/11/12, wherein the spring 17 provides a spring return force $F_S$ in response to a telescoping force applied onto one or both ends 13/14 of the crossover tube 100. As used herein, the phrase "a spring return force" or "a spring compression force" $F_S$ is used to describe a force applied by spring 17 onto the two or more telescoping tubes 10/11/12 so as to maximize an overall length of crossover tubes 100 (i.e., spring 17 is forcing end 13 of crossover tube 100 away from end 14). See again, FIG. 4. As used herein, the phrase "a telescoping force" $F_T$ is used to describe a force applied by a user onto one or both ends 13/14 of the crossover tube 100 so as to cause telescoping (or increased telescoping or overlapping or increased overlapping) of the two or more telescoping tubes 10/11/12. When a telescoping force $F_T$ is removed from one or both ends 13/14 of the crossover tube 100, the "spring return force" $F_S$ again tries to maximize the overall length of crossover tubes 100 (i.e., spring 17 forces end 13 of crossover tube 100 away from end 14).

As shown in FIGS. 1-10, exemplary crossover tubes 100 may comprise: (A) three telescoping tubes 10/11/12, the three telescoping tubes 10/11/12 being connected to one another so as to provide an aligned tube gas outlet 15 that extends from a first crossover tube end 13 to a second crossover tube end 14 opposite the first crossover tube end 13; and (B) a spring 17 positioned within the three telescoping tubes 10/11/12, the spring 17 enabling the crossover tube 100 to move from a non-use (or maximum) crossover tube length $L_O$ to an in-use (or a telescoping force induced) crossover tube length $L_O$ that is less than the non-use crossover tube length $L_O$ while applying a spring force that forces the first crossover tube end away from the second crossover tube end, the crossover tube 100 being attachable to a gas burning system (e.g., a gas grill) so as to provide crossover tube gas flow between two gas burning sections (e.g., parallel gas burners of a gas grill) of the gas burning system. See, for example, FIGS. 10 and 11.

Figure 2:
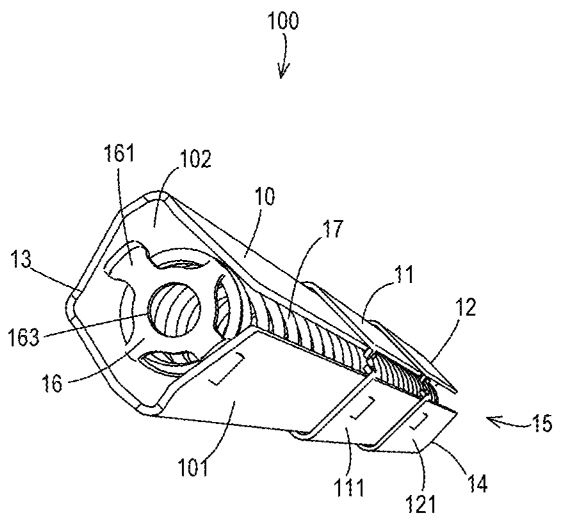
FIG. 2 depicts a perspective view of a first end of the exemplary crossover tube shown in FIG. 1.
Figure 3:
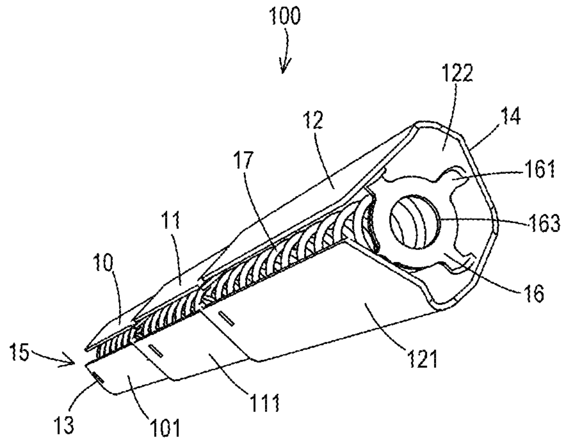
FIG. 3 depicts a perspective view of a second end opposite the first end of the exemplary crossover tube shown in FIG. 1.
Figure 10:
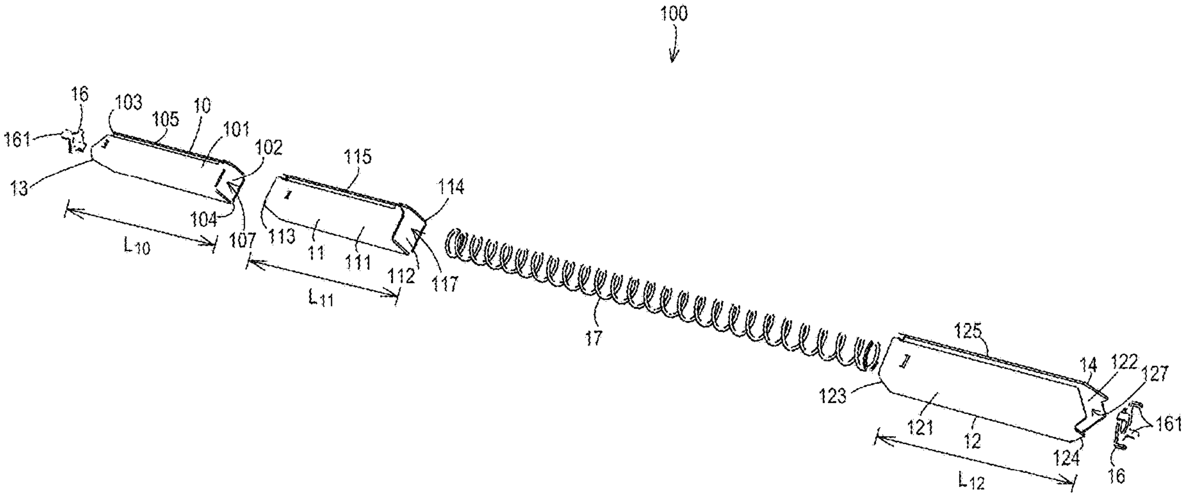
FIG. 10 depicts a perspective view of the components used to form the exemplary crossover tube shown in FIG. 1.

As shown in FIGS. 2-3 and 10, exemplary crossover tubes 100 may further comprise one or more spring stops 16, typically, two spring stops 16, within the three telescoping tubes 10/11/12 so as to limit/stop movement of the opposite ends of spring 17 within the three telescoping tubes 10/11/12.

The present invention is described above and further illustrated below by way of additional embodiments, and examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Additional Embodiments

Crossover Tube Embodiments

1. A crossover tube 100 comprising: (A) two or more telescoping tubes 10/11/12, the two or more telescoping tubes 10/11/12 being connected to one another so as to provide an aligned tube gas outlet 15 that extends from a first crossover tube end 13 to a second crossover tube end 14 opposite the first crossover tube end 13; and (B) a spring 17 positioned within (or over) the two or more telescoping tubes 10/11/12, said spring 17 enabling said crossover tube 100 to move from a non-use (or maximum) crossover tube length $L_O$ to an in-use (or a telescoping force applied) crossover tube length $L_U$ that is less than the non-use crossover tube length $L_O$ while applying a spring return force $F_S$ that forces the first crossover tube end 13 away from the second crossover tube end 14, said crossover tube 100 being attachable to a gas burning system (e.g., a gas grill) so as to provide crossover tube gas flow between two gas burning sections 200 (e.g., parallel gas burners 200 of a gas grill) of the gas burning system. See, for example, FIG. 11. As noted above, in other embodiments of the present invention (not shown), spring 17 may be positioned over at least a portion of the outer surfaces 101/111/121 of the two or more telescoping tubes 10/11/12.
2. The crossover tube 100 of embodiment 1, wherein said crossover tube 100 moves from the non-use (or maximum) crossover tube length $L_O$ to the in-use (or a telescoping force applied) crossover tube length $L_U$ when a telescoping force $F_T$ is applied onto the first crossover tube end 13 and/or the second crossover tube end 14 of said crossover tube 100, and returns towards the non-use (or maximum) crossover tube length $L_O$ when the telescoping force $F_T$ is removed from the crossover tube 100. For example, when the crossover tube 100 is positioned, for example, between two gar burner sections 200 of a gas grill 300, and the telescoping force $F_T$ is removed from the first crossover tube end 13 and/or the second crossover tube end 14 of the crossover tube 100, the crossover tube 100 expands outward towards the non-use (or maximum) crossover tube length $L_O$ until the crossover tube 100 abuts the two gas burner sections 200 of the gas grill 300. See, for example, FIG. 11.

3. The crossover tube 100 of embodiment 1 or 2, wherein the two or more telescoping tubes 10/11/12 comprises three or more telescoping tubes 10/11/12.
4. The crossover tube 100 of any one of embodiments 1 to 3, wherein the two or more telescoping tubes 10/11/12 comprises three telescoping tubes 10/11/12.
5. The crossover tube 100 of any one of embodiments 1 to 4, wherein the aligned tube gas outlet 15 comprises an aligned slot 15 extending within the two or more telescoping tubes 10/11/12.
6. The crossover tube 100 of any one of embodiments 1 to 4, wherein the aligned tube gas outlet 15 comprises aligned gas outlet holes (not shown) extending within and along each of the two or more telescoping tubes 10/11/12.
7. The crossover tube 100 of any one of embodiments 1 to 6, further comprising two spring stops 16 within the two or more telescoping tubes 10/11/12, said spring 17 being positioned between the two spring stops 16. It should be noted that in other embodiments wherein spring 17 is positioned over at least a portion of the outer surfaces 101/111/121 of the two or more telescoping tubes 10/11/12, two spring stops 16 are positioned along outer surfaces 101/111/121 of the two or more telescoping tubes 10/11/12.
8. The crossover tube 100 of embodiment 7, wherein the two spring stops 16 are positioned proximate the first crossover tube end 13 and proximate the second crossover tube end 14.
9. The crossover tube 100 of embodiment 7 or 8, wherein each of the two spring stops 16 is independently attached to an inner surface 102/112/122 of the crossover tube 100 via one or more spring stop arms 161. See, for example, FIGS. 2-3, showing one exemplary spring stop 16 attached to inner surface 102 of telescoping tube 10 in FIG. 2, and another exemplary spring stop 16 attached to inner surface 122 of telescoping tube 12 in FIG. 3. It should be noted that in other embodiments wherein spring 17 is positioned over at least a portion of the outer surfaces 101/111/121 of the two or more telescoping tubes 10/11/12, each of the two spring stops 16 is independently attached to two or more of outer surfaces 101/111/121 of the two or more telescoping tubes 10/11/12.
10. The crossover tube 100 of any one of embodiments 7 to 9, wherein each of the two spring stops 16 is independently attached to an inner surface 102/112/122 of the crossover tube 100 via two or more spring stop arms 161. See again, for example, FIGS. 2-3, showing one or more spring stop arms 161 attaching one exemplary spring stop 16 to inner surface 102 of telescoping tube 10 in FIG. 2, and another exemplary spring stop 16 to inner surface 122 of telescoping tube 12 in FIG. 3.
11. The crossover tube 100 of any one of embodiments 7 to 10, wherein each of the two spring stops 16 is independently attached to an inner surface 102/112/122 of the crossover tube 100 via from two to four spring stop arms 161. See again, for example, FIGS. 2-3.
12. The crossover tube 100 of any one of embodiments 7 to 11, wherein each of the two spring stops 16 has a spring stop surface area that is less than a cross-sectional area of the crossover tube 100 so that gas within the crossover tube 100 can pass by each of the two spring stops 16 within the crossover tube 100. See again, FIGS. 2-3.
13. The crossover tube 100 of any one of embodiments 7 to 12, wherein each of the two spring stops 16 has a centrally-located spring stop aperture 163 extending within a given spring stop 16. See again, FIGS. 2-3.
14. The crossover tube 100 of any one of embodiments 9 to 13, wherein when the aligned tube gas outlet 15 is rotated so as to be at a 3 o'clock position or a 9 o'clock position on a clock dial (or directly east or west on a compass dial), the one or more spring stop arms 161 are not positioned at the 12 o'clock position. See again, FIGS. 2-3, which shows exemplary spring stop arms 161 positioned at the following exemplary positions: (i) the 1:30 to 2 o'clock position, (ii) the 4 to 4:30 o'clock position, (iii) the 7:30 to 8 o'clock position, and (iv) the 10 to 10:30 o'clock position.
15. The crossover tube 100 of any one of embodiments 9 to 14, wherein when the aligned tube gas outlet 15 is rotated so as to be at a 3 o'clock position or a 9 o'clock position on a clock dial, the one or more spring stop arms 161 are positioned at or between one or more clock positions (e.g., one or more of 1 o'clock, 2 o'clock, etc.), but not the 12 o'clock position. See again, FIGS. 2-3.
16. The crossover tube 100 of any one of embodiments 1 to 15, wherein the first crossover tube end 13 comprises a first crossover tube end upper extension 131 and a first crossover tube end lower extension 132, and each of the first crossover tube end upper extension 131 and the first crossover tube end lower extension 132 extends outward past the aligned tube gas outlet 15. See, for example, FIGS. 4-5.
17. The crossover tube 100 of embodiment 16, wherein each of the first crossover tube end upper extension 131 and the first crossover tube end lower extension 132 extends outward past a crossover tube edge 133 opposite the aligned tube gas outlet 15 at the first crossover tube end 13. See again, for example, FIGS. 4-5.
18. The crossover tube 100 of embodiment 16 or 17, wherein the first crossover tube end upper extension 131 and the first crossover tube end lower extension 132 are configured to engage with a gas burner section 200, above and below a row of gas outlet holes 201 within the gas burner section 200. See again, for example, FIG. 11. It should be noted that each of the first crossover tube end upper extension 131 and the first crossover tube end lower extension 132 may independently further comprise one or more end edge features that enable better connection to and/or engagement with a gas burner section 200. As shown, for example, in FIGS. 6-7, each of exemplary first crossover tube end upper extension 131 and exemplary first crossover tube end lower extension 132 of exemplary crossover tube 100 comprises a notch within a central edge portion of each of the first crossover tube end upper extension 131 and the first crossover tube end lower extension 132. Such a notch or combination of notches enables the crossover tube 100 to be more easily positioned along and between some gas burner sections 200, above and below a row of gas outlet holes 201 within each gas burner section 200. It should be understood that each of the first crossover tube end upper extension 131 and the first crossover tube end lower extension 132 may comprise two or more notches (not shown) along an outer edge of each of the first crossover tube end upper extension 131 and the first crossover tube end lower extension 132.

19. The crossover tube 100 of any one of embodiments 1 to 18, wherein the second crossover tube end 14 comprises a second crossover tube end upper extension 141 and a second crossover tube end lower extension 142, and each of the second crossover tube end upper extension 141 and the second crossover tube end lower extension 142 extends outward past the aligned tube gas outlet 15. See, for example, FIGS. 4-5.

20. The crossover tube 100 of embodiment 19, wherein each of the second crossover tube end upper extension 141 and the second crossover tube end lower extension 142 extends outward past a crossover tube edge 143 opposite the aligned tube gas outlet 15 at the second crossover tube end 14. See again, for example, FIGS. 4-5.

21. The crossover tube 100 of embodiment 19 or 20, wherein the second crossover tube end upper extension 141 and the second crossover tube end lower extension 142 are configured to engage with a gas burner section 200, above and below a row of gas outlet holes 201 within the gas burner section 200. See again, for example, FIG. 11. It should be noted that similar to each of the first crossover tube end upper extension 131 and/or the first crossover tube end lower extension 132 discussed above, each of the second crossover tube end upper extension 141 and/or the second crossover tube end lower extension 142 may independently further comprise one or more end edge features that enable better connection to and/or engagement with a gas burner section 200. As shown, for example, in FIGS. 6-7, each of the second crossover tube end upper extension 141 and/or the second crossover tube end lower extension 142 of exemplary crossover tube 100 comprises a notch within a central edge portion of each of the second crossover tube end upper extension 141 and the second crossover tube end lower extension 142. Again, such a notch or combination of notches enables the crossover tube 100 to be more easily positioned along and between some gas burner sections 200, above and below a row of gas outlet holes 201 within each gas burner section 200. It should be understood that each of the second crossover tube end upper extension 141 and/or the second crossover tube end lower extension 142 may comprise two or more notches (not shown) along an outer edge of each of the second crossover tube end upper extension 141 and/or the second crossover tube end lower extension 142.

22. The crossover tube 100 of any one of embodiments 1 to 21, wherein each telescoping tube 10/11/12 comprises (a) an individual tube length $L_{10}/L_{11}/L_{12}$ extending from a first individual tube end 103/113/123 to a second individual tube end 104/114/124 opposite the first individual tube end 103/113/123, (b) a tube outer surface 101/111/121 extending from the first individual tube end 103/113/123 to the second individual tube end 104/114/124, (c) a tube inner surface 102/112/122 extending from the first individual tube end 103/113/123 to the second individual tube end 104/114/124, (d) a tube channel 107/117/127 extending from the first individual tube end 103/113/123 to the second individual tube end 104/114/124 along the tube inner surface 102/112/122, and (e) an individual tube gas outlet 105/115/125 extending from the first individual tube end 103/113/123 to the second individual tube end 104/114/124, wherein the individual tube gas outlets 105/115/125 of the two or more telescoping tubes combine with one another to form the aligned tube gas outlet 15.

23. The crossover tube 100 of any one of embodiments 1 to 22, wherein each telescoping tube 10/11/12 comprising (a) an individual tube length $L_{10}/L_{11}/L_{12}$ extending from the a first individual tube end 103/113/123 to the second individual tube end 104/114/124, wherein each individual tube length $L_{10}/L_{11}/L_{12}$ independently ranges from about 1.0 inch (in) to about 8.0 in (or any value between 1.0 in and 8.0 in, in increments of 0.1 in, e.g., 4.2 in, or any range of values between 1.0 in and 8.0 in, in increments of 0.1 in, e.g., 3.5 in to 6.1 in).

24. The crossover tube 100 of any one of embodiments 1 to 23, wherein each telescoping tube 10/11/12 comprising (a) an individual tube length $L_{10}/L_{11}/L_{12}$ extending from the a first individual tube end 103/113/123 to the second individual tube end 104/114/124, wherein each individual tube length $L_{10}/L_{11}/L_{12}$ independently ranges from about 2.0 in to about 5.0 in (or any value between 2.0 in and 5.0 in, in increments of 0.1 in, e.g., 3.2 in, or any range of values between 2.0 in and 5.0 in, in increments of 0.1 in, e.g., 2.8 in to 3.1 in).

25. The crossover tube 100 of any one of embodiments 1 to 24, wherein each telescoping tube 10/11/12 comprising a metal selected from steel, stainless steel, or any combination thereof.

Figure 4:
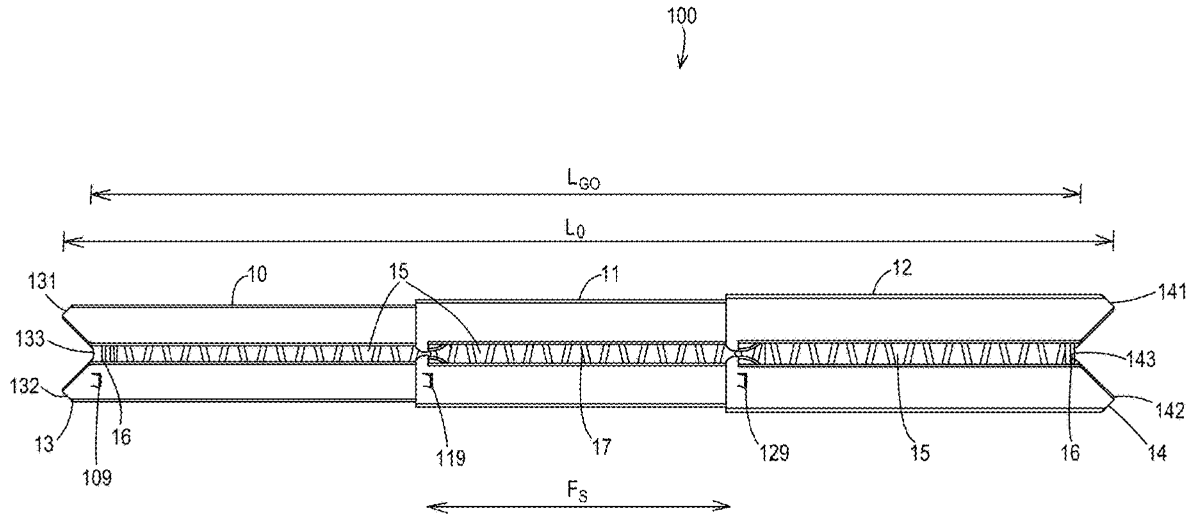
FIG. 4 depicts a front view of the exemplary crossover tube shown in FIG. 1.
Figure 5:
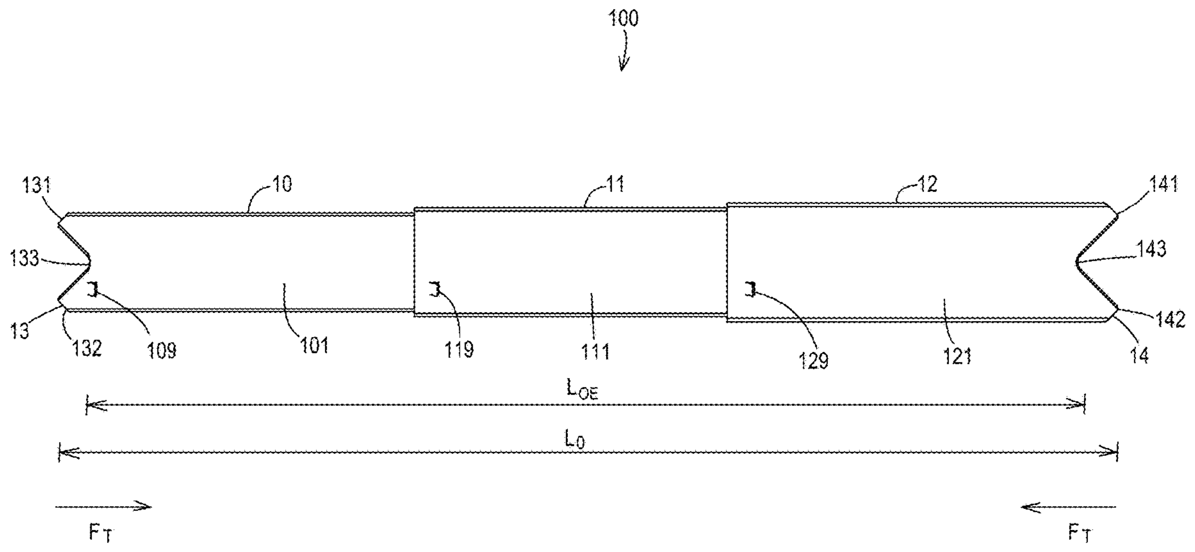
FIG. 5 depicts a rear view of the exemplary crossover tube shown in FIG. 4.
Figure 6:
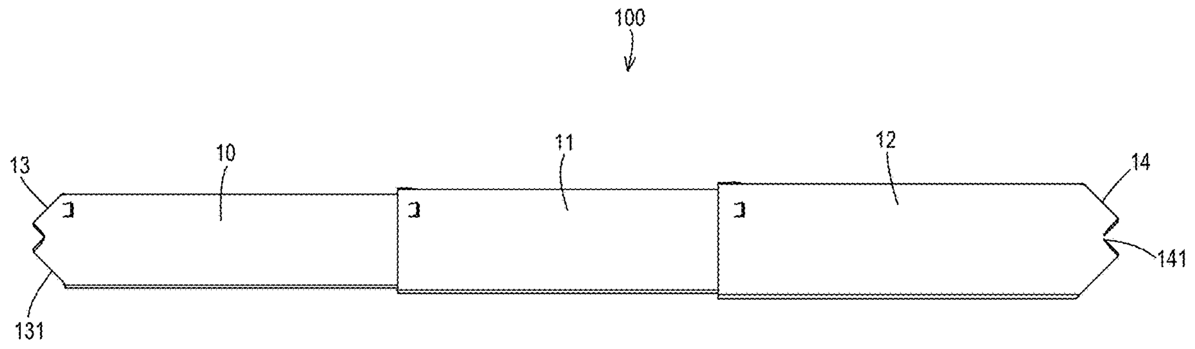
FIG. 6 depicts a top view of the exemplary crossover tube shown in FIG. 4.
Figure 7:
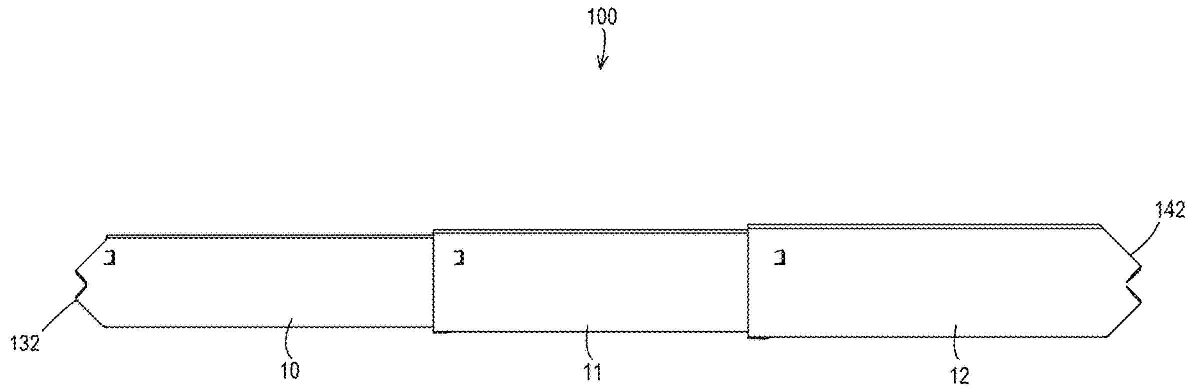
FIG. 7 depicts a bottom view of the exemplary crossover tube shown in FIG. 4.
Figure 8:
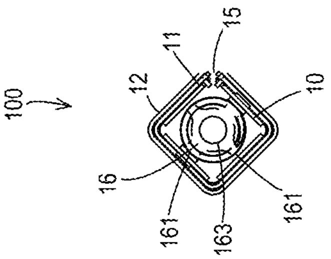
FIG. 8 depicts a left-hand view of the exemplary crossover tube shown in FIG. 4.
Figure 9:
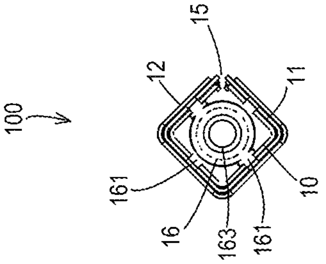
FIG. 9 depicts a right-hand view of the exemplary crossover tube shown in FIG. 4.

26. The crossover tube 100 of any one of embodiments 1 to 25, wherein said crossover tube 100 has a non-use (or maximum) crossover tube length $L_O$ (i.e., when the crossover tube 100 is resting with no restricting forces being applied to the crossover tube 100 such as shown in FIG. 4) ranging from about 4.0 in to about 12.0 in (or any value between 4.0 in and 12.0 in, in increments of 0.1 in, e.g., 8.4 in, or any range of values between 4.0 in and 12.0 in, in increments of 0.1 in, e.g., 6.5 in to 11.5 in).

27. The crossover tube 100 of any one of embodiments 1 to 26, wherein said crossover tube 100 has a non-use (or maximum) crossover tube length $L_O$ (i.e., when the crossover tube 100 is resting with no restricting forces being applied to the crossover tube 100 such as shown in FIG. 4) ranging from about 5.5 in to about 10.0 in (or any value between 5.5 in and 10.0 in, in increments of 0.1 in, e.g., 8.5 in, or any range of values between 5.5 in and 10.0 in, in increments of 0.1 in, e.g., 8.2 in to 9.5 in).

Figure 11:
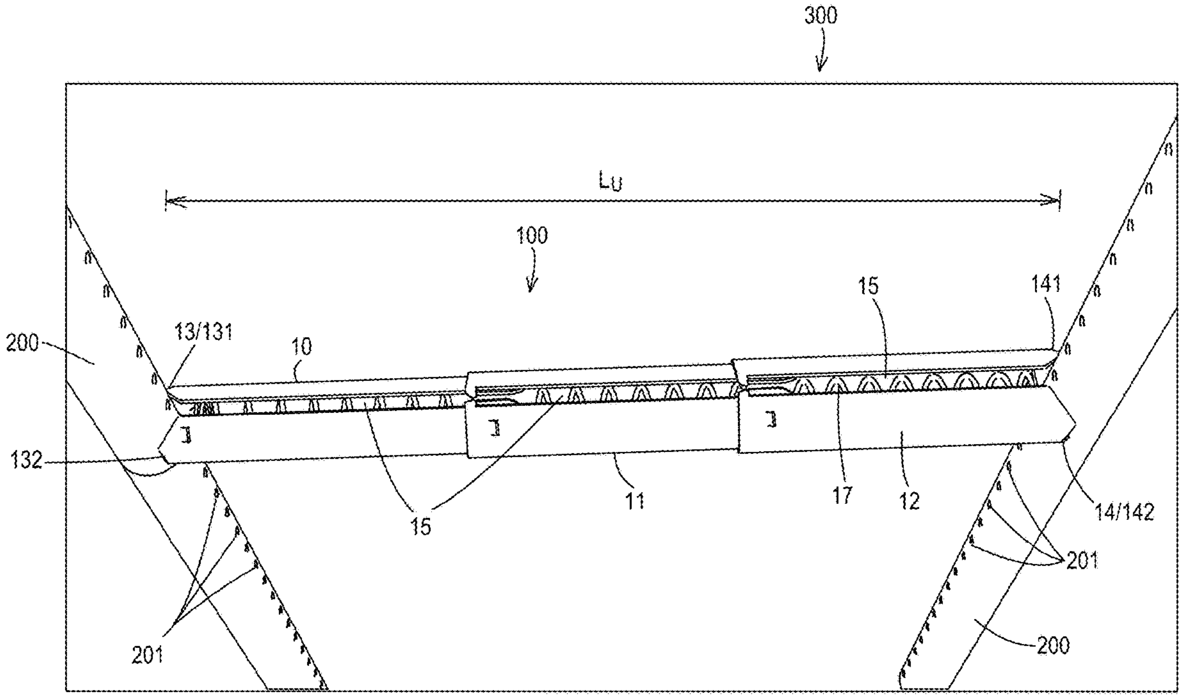
FIG. 11 depicts the exemplary crossover tube shown in FIG. 1 attached to a gas grill, across two gas burner sections of the gas grill.

28. The crossover tube 100 of any one of embodiments 1 to 27, wherein said crossover tube 100 has an in-use (or a telescoping force applied) crossover tube length $L_U$ (i.e., when a telescoping force $F_T$ has been applied to one or both ends 13/14 of the crossover tube 100 such as shown in FIG. 11) of less than 95% of the non-use (or maximum) crossover tube length $L_O$ (i.e., when the crossover tube 100 is resting with no restricting forces being applied to the crossover tube 100 such as shown in FIG. 4).

29. The crossover tube 100 of any one of embodiments 1 to 28, wherein said crossover tube 100 has an in-use (or a telescoping force applied) crossover tube length $L_U$ (i.e., when a telescoping force $F_T$ has been applied to one or both ends 13/14 of the crossover tube 100 such as shown in FIG. 11) of from about 40% to about 90% of the non-use (or maximum) crossover tube length $L_O$ (i.e., when the crossover tube 100 is resting with no restricting forces being applied to the crossover tube 100 such as shown in FIG. 4) (or any value between 40% and 90%, in increments of 0.1%, e.g., 42.4%, or any range of values between 40% and 90%, in increments of 0.1%, e.g., 40.1% to 65.0%).
30. The crossover tube 100 of any one of embodiments 1 to 29, wherein said crossover tube 100 has an in-use (or a telescoping force applied) crossover tube length $L_U$ (i.e., when a telescoping force $F_T$ has been applied to one or both ends 13/14 of the crossover tube 100 such as shown in FIG. 11) of from about 40% to about 80% of the non-use (or maximum) crossover tube length $L_O$ (i.e., when the crossover tube 100 is resting with no restricting forces being applied to the crossover tube 100 such as shown in FIG. 4) (or any value between 40% and 80%, in increments of 0.1%, e.g., 44.4%, or any range of values between 40% and 80%, in increments of 0.1%, e.g., 60.1% to 75.0%).
31. The crossover tube 100 of any one of embodiments 1 to 30, wherein said non-use (or maximum) crossover tube length $L_O$ (i.e., when the crossover tube 100 is resting with no restricting forces being applied to the crossover tube 100 such as shown in FIG. 4) is greater than a crossover tube length $L_{GO}$ along said aligned tube gas outlet 15. See, for example, FIG. 4.
32. The crossover tube 100 of any one of embodiments 1 to 31, wherein said non-use (or maximum) crossover tube length $L_O$ (i.e., when the crossover tube 100 is resting with no restricting forces being applied to the crossover tube 100 such as shown in FIG. 4) is greater than a crossover tube length $L_{OE}$ along the crossover tube 100 opposite said aligned tube gas outlet 15 (i.e., from (1) crossover tube edge 133 opposite the aligned tube gas outlet 15 at the first crossover tube end 13 to (2) crossover tube edge 143 opposite the aligned tube gas outlet 15 at the second crossover tube end 14). See, for example, FIG. 5.
33. The crossover tube 100 of any one of embodiments 1 to 32, wherein said crossover tube 100 has (A) a crossover tube length $L_{GO}$ along said aligned tube gas outlet 15, and (B) a crossover tube length $L_{OE}$ along the crossover tube 100 opposite said aligned tube gas outlet 15 (i.e., from (1) crossover tube edge 133 opposite the aligned tube gas outlet 15 at the first crossover tube end 13 to (2) crossover tube edge 143 opposite the aligned tube gas outlet 15 at the second crossover tube end 14), and the crossover tube length $L_{GO}$ is substantially equal to (or identical to) the crossover tube length $L_{OE}$.
34. The crossover tube 100 of any one of embodiments 1 to 33, wherein said first crossover tube end 13 and said second crossover tube end 14 are each configured to abut and/or engage with and/or connect to a gas burning section 200 (e.g., a gas burner 200 of a gas grill) of the gas burning system. See, for example, FIG. 11. Typically, first crossover tube end 13 and second crossover tube end 14 are each independently designed to abut (and be positioned between) two gas burning sections 200 of a gas burning system 300 so that a gap exists between (a)(i) a crossover tube edge 133 opposite the aligned tube gas outlet 15 at the first crossover tube end 13 and (ii) an outer side wall of a first gas burning section 200 of a gas burning system 300, and (b)(i) a crossover tube edge 143 opposite the aligned tube gas outlet 15 at the second crossover tube end 14 and (ii) a outer side wall of a second gas burning section 200 of the gas burning system 300.
35. The crossover tube 100 of any one of embodiments 1 to 34, wherein said first crossover tube end 13 and said second crossover tube end 14 are each configured to abut and/or engage with and/or connect to a gas burner 200 of a gas grill 300. See, for example, FIG. 11.
36. The crossover tube 100 of any one of embodiments 1 to 35, wherein said first crossover tube end 13 and said second crossover tube end 14 are each configured to abut and/or engage with and/or connect to a gas burner 200 of a gas grill 300 so that the aligned tube gas outlet 15 of the crossover tube 100 is positioned adjacent to a row of gas outlet holes 201 within a gas burner 200 of a gas grill 300. See again, for example, FIG. 11.
37. The crossover tube 100 of any one of embodiments 1 to 36, wherein the crossover tube 100 further comprises one or more tube stops 109/119/129 along the two or more telescoping tubes 10/11/12, the one or more tube stops 109/119/129 enabling the two or more telescoping tubes 10/11/12 to move relative to one another, but remain attached to one another. See, for example, FIGS. 4-5.
38. The crossover tube 100 of any one of embodiments 1 to 37, wherein each of the two or more telescoping tubes 10/11/12 has a circular cross-sectional area.
39. The crossover tube 100 of any one of embodiments 1 to 37, wherein each of the two or more telescoping tubes 10/11/12 has an oval cross-sectional area.
40. The crossover tube 100 of any one of embodiments 1 to 37, wherein each of the two or more telescoping tubes 10/11/12 has a triangular or square or rectangular, or other multi-sided (e.g., 5 or more sides, typically from 5 to 8 sides) cross-sectional area.
41. The crossover tube 100 of any one of embodiments 1 to 37 and 40, wherein each of the two or more telescoping tubes 10/11/12 has a square cross-sectional area.
42. The crossover tube 100 of any one of embodiments 1 to 41, wherein said aligned tube gas outlet 15 extends along the two or more telescoping tubes 10/11/12 from (a) a tube inner surface 102/112/122 extending from a first individual tube end 103/113/123 to a second individual tube end 104/114/124 to (b) a tube outer surface 101/111/121 extending from the first individual tube end 103/113/123 to the second individual tube end 104/114/124.
43. The crossover tube 100 of any one of embodiments 1 to 37 and 39 to 42, wherein said aligned tube gas outlet 15 extends along the two or more telescoping tubes 10/11/12 at an intersection of two side walls of each of the two or more telescoping tubes 10/11/12. See again, for example, FIGS. 1-4 and 8-10.
44. The crossover tube 100 of any one of embodiments 1 to 37 and 39 to 43, wherein each of the two or more telescoping tubes 10/11/12 has a square cross-sectional area, and said aligned tube gas outlet 15 extends along a corner edge of the square cross-sectional area of each of the two or more telescoping tubes 10/11/12. See again, for example, FIGS. 1-4 and 8-11.

Methods of Making Crossover Tubes Embodiments

45. A method for making the crossover tube 100 of any one of embodiments 1 to 44, said method comprising: positioning spring 17 within (or over) the two or more telescoping tubes 10/11/12 so that the spring 17 provides a spring return force $F_S$ in response to a telescoping force $F_T$ applied onto one or both ends 13/14 of the crossover tube 100.

46. A method for making a crossover tube 100, said method comprising: positioning a spring 17 within (or over) two or more telescoping tubes 10/11/12 so that the spring 17 provides a spring return force $F_S$ in response to a telescoping force $F_T$ being applied onto a first crossover tube end 13 of the crossover tube 100 or a second crossover tube end 14 opposite the first crossover tube end 13, the two or more telescoping tubes 10/11/12 being connected to one another so as to provide an aligned tube gas outlet 15 that extends from the first crossover tube end 13 to the second crossover tube end 14, the spring 17 enabling the crossover tube 100 to move from a non-use (or maximum) crossover tube length $L_O$ to an in-use (or a telescoping force applied) crossover tube length $L_U$ that is less than the non-use crossover tube length $L_O$ when the telescoping force $F_T$ is applied, the crossover tube 100 being attachable to a gas burning system (e.g., a gas grill) so as to provide crossover tube gas flow between two gas burning sections 200 (e.g., parallel gas burners 200 of a gas grill) of the gas burning system.

47. The method of embodiment 39, wherein the method comprises one or more additional steps so as to provide one or more features recited in embodiments 2 to 44, wherein the one or more additional steps include, but are not limited to, forming each of the two or more telescoping tubes 10/11/12; forming one or more end edge features (e.g., notches) within one or more opposite ends 13/14 of the crossover tube 100, the one or more end edge features (e.g., notches) enabling better connection to and/or engagement with a gas burner section 200; attaching/connecting individual telescoping tubes 10/11/12 to one another; attaching one or more spring stops 16 to the two or more telescoping tubes 10/11/12; forming one or more tube stops 109/119/129 within a given telescoping tube 10/11/12; or any combination thereof.

Methods of Using Crossover Tubes Embodiments

48. A method of using the crossover tube 100 of any one of embodiments 1 to 44, said method comprising: attaching the crossover tube 100 to a gas burning system 300 (e.g., a gas grill 300) so as to connect a first gas outlet section 200 of the gas burning system 300 (e.g., a gas grill 300) to a second gas outlet section 200 of the gas burning system 300 (e.g., a gas grill 300).

49. A method of using a crossover tube 100, said method comprising: applying a telescoping force $F_T$ onto one or both ends 13/14 of a crossover tube 100 so as to cause telescoping of two or more telescoping tubes 10/11/12 of the crossover tube 100, and an increase in a spring return force $F_S$ of a spring 17 positioned within (or over) the two or more telescoping tubes 10/11/12 of the crossover tube 100 in response to the telescoping force $F_T$; and attaching the crossover tube 100 to a gas burning system 300 (e.g., a gas grill 300) so as to connect a first gas outlet section 200 of the gas burning system 300 (e.g., a gas grill 300) to a second gas outlet section 200 of the gas burning system 300 (e.g., a gas grill 300).

50. The method of embodiment 48 or 49, wherein said attaching step comprises releasing the telescoping force $F_T$ so that a spring return force $F_S$ of a spring 17 forces opposite ends 13/14 of the crossover tube 100 away from one another and towards a first gas outlet section 200 of a gas burning system 300 (e.g., a gas grill 300) and a second gas outlet section 200 of the gas burning system 300 (e.g., a gas grill 300). See again, FIG. 11.

51. The method of any one of embodiments 48 to 50, wherein spring 17 is positioned within the two or more telescoping tubes 10/11/12 of the crossover tube 100.

52. The method of any one of embodiments 48 to 50, wherein spring 17 is positioned over the two or more telescoping tubes 10/11/12 of the crossover tube 100.

53. The method of any one of embodiments 48 to 52, wherein the crossover tube 100 is attached to a gas grill 300.

Gas Grill Embodiments

54. A gas grill comprising one or more crossover tubes, and at least one of the one or more crossover tubes comprises the crossover tube 100 of any one of embodiments 1 to 44.

Kits

55. A kit comprising one or more crossover tubes, at least one of the one or more crossover tubes comprises the crossover tube 100 of any one of embodiments 1 to 44.

56. The kit of embodiment 55, wherein the kit comprises from two to five crossover tubes, and each crossover tube comprises the crossover tube 100 of any one of embodiments 1 to 44.

57. The kit of embodiment 55, wherein each crossover tube has a non-use (or maximum) crossover tube length $L_O$ (i.e., when the crossover tube 100 is resting with no restricting forces being applied to the crossover tube 100 such as shown in FIG. 4) ranging from about 4.0 in to about 12.0 in (or any value between 4.0 in and 12.0 in, in increments of 0.1 in, e.g., 8.4 in, or any range of values between 4.0 in and 12.0 in, in increments of 0.1 in, e.g., 6.5 in to 11.5 in).

58. The kit of embodiment 56 or 57, wherein each crossover tube has the same non-use (or maximum) crossover tube length $L_O$.

EXAMPLES

Crossover tubes 100, as shown in FIGS. 1-11, and described above and in embodiments 1 to 44, were formed, and used in gas grills 300, similar to the use shown in FIG. 11, to provide crossover tube gas flow between two gas burning sections 200 (e.g., parallel gas burners 200) of a gas grill 300.

It should be understood that although the above-described crossover tubes 100, gas-burning systems 300, and/or methods are described as "comprising" one or more components or steps, the above-described crossover tubes 100, gas-burning systems 300, and/or methods may "comprise," "consists of," or "consist essentially of" any of the above-described components, features, or steps of the crossover tubes 100, gas-burning systems 300, and/or methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains," "containing," "characterized by" or any other variation thereof, are intended to encompass a non-exclusive inclusion, subject to any limitation explicitly indicated otherwise, of the recited components. For example, a crossover tube 100, gas-burning system 300, and/or method that "comprises" a list of elements (e.g., components, features, or steps) is not necessarily limited to only those elements (or components or steps), but may include other elements (or components or steps) not expressly listed or inherent to the crossover tube 100, gas-burning system 300, and/or the method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a crossover tube 100, gas-burning system 300, and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of."

Further, it should be understood that the herein-described crossover tubes 100, gas-burning systems 300, and/or methods may comprise, consist essentially of, or consist of any of the herein-described components and features, with or without any additional feature(s). In other words, in some embodiments, the crossover tubes 100, gas-burning systems 300, and/or methods of the present invention do not have any additional features other than those described herein, and such additional features, not described herein, are specifically excluded from the crossover tubes 100, gas-burning systems 300, and/or methods. In other embodiments, the crossover tubes 100, gas-burning systems 300, and/or methods of the present invention do have one or more additional features that are not described herein.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A crossover tube comprising:

(A) two or more telescoping tubes, the two or more telescoping tubes being connected to one another so as to provide an aligned tube gas outlet that extends from a first crossover tube end to a second crossover tube end opposite the first crossover tube end; and (B) a spring positioned within the two or more telescoping tubes, said spring enabling said crossover tube to move from a non-use (or maximum) crossover tube length $L_O$ to an in-use crossover tube length $L_U$ that is less than the non-use crossover tube length $L_O$ while applying a spring return force that forces the first crossover tube end away from the second crossover tube end, said crossover tube being attachable to a gas burning system so as to provide crossover tube gas flow between two gas burning sections of the gas burning system.

2. The crossover tube of claim 1, wherein said crossover tube moves from the non-use (or maximum) crossover tube length $L_O$ to the in-use crossover tube length $L_U$ when a telescoping force $F_T$ is applied onto the first crossover tube end, the second crossover tube end, or both the first crossover end and the second crossover end of said crossover tube, and returns towards the non-use (or maximum) crossover tube length $L_O$ when the telescoping force $F_T$ is removed from the crossover tube.

3. The crossover tube of claim 2, wherein the two or more telescoping tubes comprises three or more telescoping tubes.

4. The crossover tube of claim 3, wherein the two or more telescoping tubes comprises three telescoping tubes.

5. The crossover tube of claim 2, wherein the aligned tube gas outlet comprises an aligned slot extending within the two or more telescoping tubes.

6. The crossover tube of claim 2, wherein the aligned tube gas outlet comprises aligned gas outlet holes extending within and along each of the two or more telescoping tubes.

7. The crossover tube of claim 2, further comprising two spring stops within the two or more telescoping tubes, said spring being positioned between the two spring stops.

8. The crossover tube of claim 7, wherein the two spring stops are positioned proximate the first crossover tube end and proximate the second crossover tube end, and each of the two spring stops has a spring stop surface area that is less than a cross-sectional area of the crossover tube so that gas within the crossover tube can pass by each of the two spring stops within the crossover tube.

9. The crossover tube of claim 7, wherein each of the two spring stops is independently attached to an inner surface of the crossover tube via two or more spring stop arms, and when the aligned tube gas outlet is rotated so as to be at a 3 o'clock position or a 9 o'clock position on a clock dial, the one or more spring stop arms are not positioned at the 12 o'clock position.

10. A crossover tube comprising:

(A) three telescoping tubes, the three telescoping tubes being connected to one another so as to provide an aligned tube gas outlet that extends from a first crossover tube end to a second crossover tube end opposite the first crossover tube end;

(B) a spring positioned within the three telescoping tubes, said spring enabling said crossover tube to move from a non-use (or maximum) crossover tube length $L_O$ to an in-use crossover tube length $L_U$ that is less than the non-use crossover tube length $L_O$ while applying a spring return force that forces the first crossover tube end away from the second crossover tube end, said crossover tube being attachable to a gas burning system so as to provide crossover tube gas flow between two gas burning sections of the gas burning system; and (C) two spring stops within the three telescoping tubes with said spring being positioned between the two spring stops, the two spring stops being positioned proximate the first crossover tube end and proximate the second crossover tube end, and each of the two spring stops has a spring stop surface area that is less than a cross-sectional area of the crossover tube so that gas within the crossover tube can pass by each of the two spring stops within the crossover tube, wherein (1) each of the three telescoping tubes has a square cross-sectional area, and said aligned tube gas outlet extends along a corner edge of the square cross-sectional area of each of the three telescoping tubes, (2) the first crossover tube end comprises (a) a first crossover tube end upper extension and (b) a first crossover tube end lower extension, and each of the first crossover tube end upper extension and the first crossover tube end lower extension extends outward past the aligned tube gas outlet, (3) the second crossover tube end comprises a second crossover tube end upper extension and a second crossover tube end lower extension, and each of the second crossover tube end upper extension and the second crossover tube end lower extension extends outward past the aligned tube gas outlet, (4) the first crossover tube end upper extension and the first crossover tube end lower extension are configured to engage with a first gas burner section of a gas grill, above and below a first row of gas outlet holes within the first gas burner section, and (5) the second crossover tube end upper extension and the second crossover tube end lower extension are configured to engage with a second gas burner section of the gas grill, above and below a second row of gas outlet holes within the second gas burner section.

11. The crossover tube of claim 10, wherein each of the two spring stops is independently attached to an inner surface of the crossover tube via two or more spring stop arms, and when the aligned tube gas outlet is rotated so as to be at a 3 o'clock position or a 9 o'clock position on a clock dial, the one or more spring stop arms are not positioned at the 12 o'clock position.

12. A kit comprising one or more crossover tubes, at least one of the one or more crossover tubes comprising the crossover tube of claim 11.

13. A gas grill comprising one or more crossover tubes, and at least one of the one or more crossover tubes comprising the crossover tube of claim 11.

14. A crossover tube comprising:

(A) two or more telescoping tubes, the two or more telescoping tubes being connected to one another so as to provide an aligned tube gas outlet that extends from a first crossover tube end to a second crossover tube end opposite the first crossover tube end; and (B) a spring positioned within or over at least a portion of the two or more telescoping tubes so as to provide a spring return force in response to a telescoping force applied onto one or both of the first crossover tube end and the second crossover tube end, the spring return force forcing the first crossover tube end away from the second crossover tube end.

15. The crossover tube of claim 14, wherein the two or more telescoping tubes comprises three telescoping tubes.

16. The crossover tube of claim 14, further comprising two spring stops within the two or more telescoping tubes with said spring being positioned between the two spring stops, the two spring stops being positioned proximate the first crossover tube end and proximate the second crossover tube end, and each of the two spring stops has a spring stop surface area that is less than a cross-sectional area of the crossover tube so that gas within the crossover tube can pass by each of the two spring stops within the crossover tube.

17. The crossover tube of claim 16, wherein each of the two spring stops is independently attached to an inner surface of the crossover tube via two or more spring stop arms, and when the aligned tube gas outlet is rotated so as to be at a 3 o'clock position or a 9 o'clock position on a clock dial, the one or more spring stop arms are not positioned at the 12 o'clock position.

18. The crossover tube of claim 14, wherein each of the two or more telescoping tubes has a square cross-sectional area, and said aligned tube gas outlet extends along a corner edge of the square cross-sectional area of each of the two or more telescoping tubes.

19. A kit comprising one or more crossover tubes, at least one of the one or more crossover tubes comprising the crossover tube of claim 14.

20. A gas grill comprising one or more crossover tubes, and at least one of the one or more crossover tubes comprising the crossover tube of claim 14.

* * * * *